Figure 1:
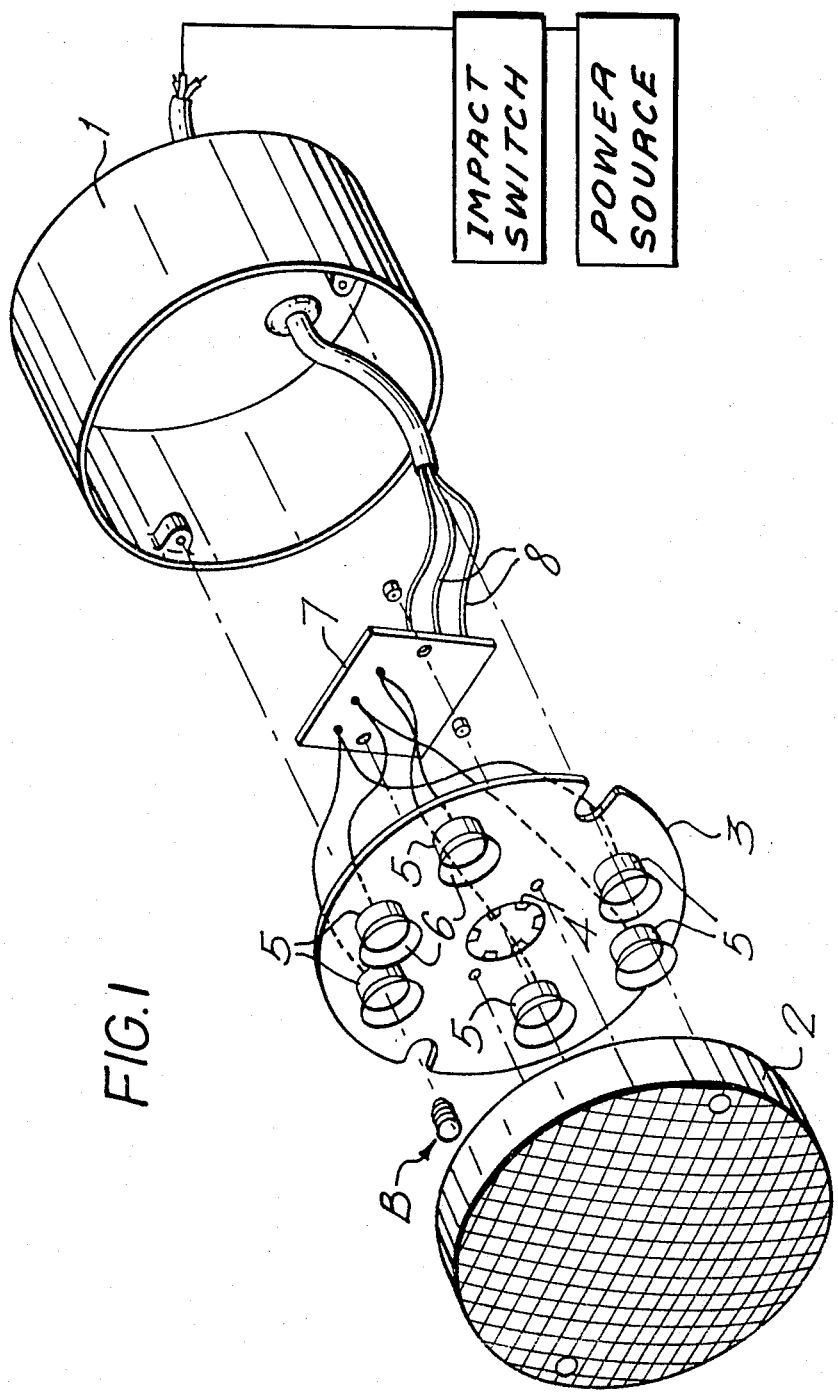

United States Patent [19]

Pillinger et al.

[11] Patent Number: 4,621,253

[45] Date of Patent: Nov. 4, 1986

[54] WARNING LIGHT

[75] Inventors: Keith J. Pillinger; David S. Griffith, both of Bristol, England

[73] Assignee: Rotalight Limited, Bristol, England

[21] Appl. No.: 473,148

[22] Filed: Mar. 7, 1983

[30] Foreign Application Priority Data

Mar. 5, 1982 [GB] United Kingdom ............... 82-06476
Aug. 7, 1982 [GB] United Kingdom ............... 82-22831

[51] Int. Cl.⁴ .............................................. B60Q 1/00
[52] U.S. Cl. .................................... 340/84; 340/81 R
[58] Field of Search .............. 340/103, 107, 108, 109, 340/815.15, 815.19, 815.74, 74, 81 R, 84, 89

[56] References Cited

U.S. PATENT DOCUMENTS 1,344,084 6/1920 Hackett .
3,113,293 12/1963 Breese et al. .
3,286,055 11/1966 Jewell ................. 340/81 R
3,471,829 10/1969 Kahn .................... 340/119
3,789,387 1/1974 Hurst ................ 340/815.19
4,214,168 7/1980 Kulka ..................... 340/84

FOREIGN PATENT DOCUMENTS 1436812 3/1966 France .

Primary Examiner—John W. Caldwell, Sr.
Assistant Examiner—Tyrone Queen
Attorney, Agent, or Firm—Cushman, Darby & Cushman

[57] ABSTRACT

A hazard warning light for attachment to a vehicle is designed to give the illusion of a rotating lamp of high intensity and is actuable by the driver of one vehicle to alert following cars to the existence of an emergency e.g. a car crash. The light incorporates electronic circuitry.

20 Claims, 3 Drawing Figures

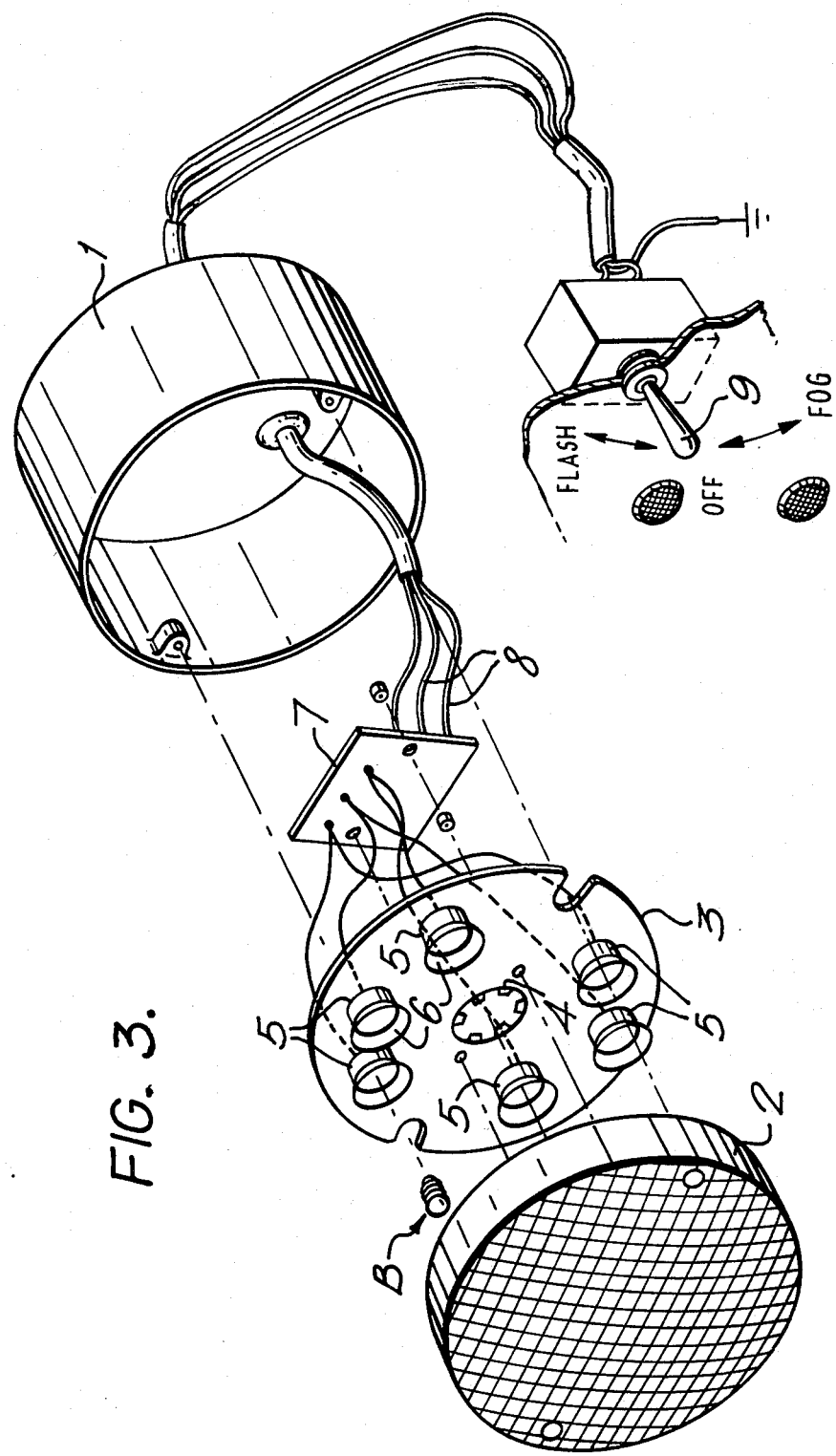

WARNING LIGHT

The invention relates to a warning light, primarily intended for use with vehicles but of value in many mobile or fixed situations where it is necessary to give a warning that something untoward has happened. For convenience, the invention will be described more particularly with reference to its application to land vehicles, typically automobiles.

Experience has taught us that many road accidents, especially multiple accidents, occur because travelling cars following a stationary vehicle do not realise that the first vehicle has stopped, e.g. crashed. The driver of a stopped vehicle has only one safe means to show to following cars that there is a hazard to following vehicles - he actuates both the left and right turn indicators of his vehicle simultaneously. To a following vehicle, however, this signal can have many interpretations but not necessarily its intended purpose. The first following car can mask or hide the turn indicators of the crashed car and to the driver of the second following car or a car in a different lane the stationary car appears to be turning as only one flashing indicator is visible. The risk can be accentuated where the second vehicle is a large one such as a lorry, bus or a coach. In this way multiple pile ups occur.

It is one object of the invention to provide an improved hazard warning light system. It is another object to provide on each vehicle a light designed to give the illusion of turning.

According to one aspect of the invention there is provided a hazard warning light comprising a housing having a front light transmitting face, the housing containing a support plate having a plurality of light bulbs, reflective surfaces being present behind the bulbs, in which the bulbs are arranged to operate in pairs as to give the illusion of turning.

Most preferably the lamps are arranged to give an illumination substantially equal to that of a fog light, and are each 5 watts or more.

Most preferably the hazard warning light is mounted at the rear of a vehicle and is preferably associated with a rear fog light which every vehicle should have.

Preferably the hazard light is associated with a fog lamp and the warning light may be used together or independently of the fog lamp. The illumination caused by the illusion of turning should match that of the standard 21 watt fog light.

The hazard warning light may be actuated in a variety of ways e.g. by a specific switch e.g. on the vehicle dashboard or by being in circuit with an existing switch such as the horn or it may be wired up to operate even when the driver is incapacitated, e.g. by an impact switch.

The front face of the housing is arranged to transmit light. While the face may be transparent, it is preferred that the face be coloured, and red and blue are preferred colours.

The strength of the light bulbs and reflective surfaces and/or the light transmitting properties of the front face are so chosen that the illusion of turning lights will reach a distance related to the safe stopping distance for vehicles travelling at high speed: according to the British Highway Code for a vehicle travelling at about 112 km.p.h. (70 m.p.h.) the safe stopping distance is 96 meters (315 feet).

Preferably the light bulbs are arranged in pairs and in circuit with a clock unit and a counter unit, the clock pulses being arranged to generate logic output in selected pins of the counter unit, the outputs being arranged to energise a transistor to illuminate each pair of bulbs. Most preferably each output is passed to a buffer transistor and to cause a current below about 200 m/A, which is passed to the illuminating transistor. The invention further includes, as another aspect, the circuit for use in actuating an electrical device.

The invention includes the light described herein as an accessory to be mounted on a vehicle and a vehicle or stand including one or more such lights.

Figure 2:
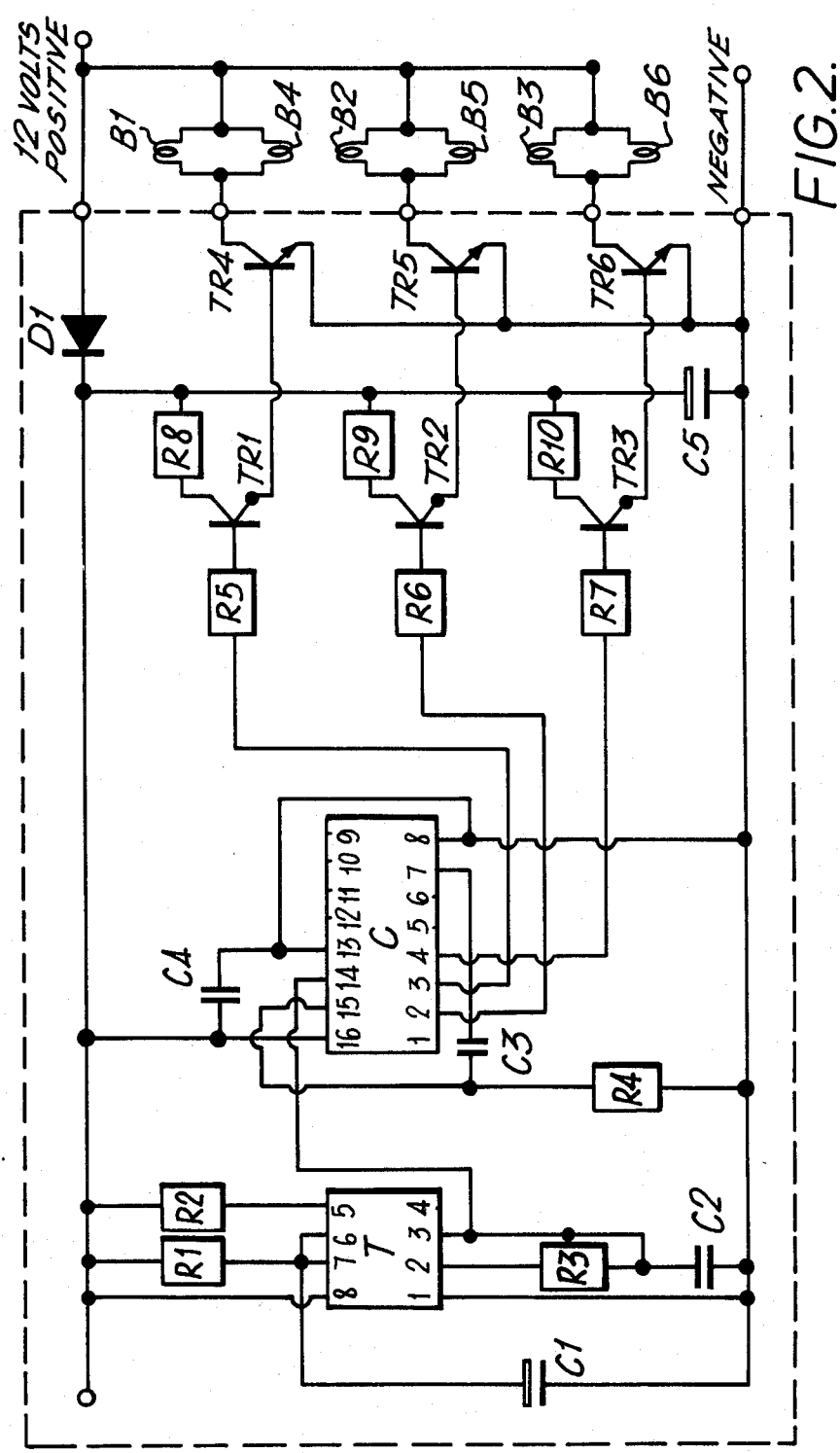

In order that the invention may be well understood it will now be described with reference to the accompanying diagrammatic drawings in which, FIG. 1 is an exploded perspective view of a light of the invention; and FIG. 2 is a circuit diagram of the light.

FIG. 3 is an alternate embodiment of the invention.

The light of FIG. 1 comprises a housing formed of a back cover 1 and a front glass-like face 2. Both parts are moulded of plastics and the face 2 consists of a grid-like surface arranged to defract and refract light. A support plate 3 is mounted in the housing and has a central hole 4 to receive a 21 watt fog lamp. There are six individual sockets 5 spaced about the hole 4 and each is to receive a 5 watt bulb, B1 to B6. Each bulb is surrounded by an annular reflective surface 6, generally cup like in shape. Behind the support plate 3 is a printed circuit board 7. Two fixing screws, not shown, are used to hold the parts in assembly and the light is secured to a support, for example, the rear bumper of a car, coach, fire engine, ambulance, police car, etc. Wires 8 lead from the printed circuit board through the back of the housing 1 to a dashboard, not shown, having a switch 9 to actuate either the fog lamp or the hazard light or both.

The bulbs B1 to B6 are arranged to operate in pairs as shown: B1 and B4; B2 and B5; B3 and B6. The bulbs are arranged to switch on in the sequence B1 and B4; B2 and B5; B3 and B6, while the circuit is energised.

As shown in FIG. 2, the circuit consists of an integrated circuit timer T and an integrated circuit counter C co-operating through buffer circuits: TR1, TR2 and TR3 to three electronic switches: TR4, TR5 and TR6.

When the circuit is switched on, the timer T produces clocking pulses at pin 3, the frequency of which is determined by the component values of resistor R1, capacitor C1 and resistor R2. These clock pulses are fed into pin 14 of the counter C. On receiving the first clock impulse, the counter produces a logic output on pin 3. On receiving the second clock pulse, the logic output disappears on pin 3 and appears on pin 2. On receiving a third clock pulse, the logic output disappears on pin 2 and appears on pin 4. On receiving a fourth clock pulse, logic disappears at pin 4 and appears on pin 7 and is fed through capacitor C3 to the reset pin 15 thus logic appears on pin 3 starting the sequence again.

The logic outputs of counter C are connected through resistances R5, R6 and R7 to the base of buffer transistors TR1, TR2 and TR3. When a logic voltage is applied to one of these buffer transistors, say TR1, TR1 conducts and a positive voltage appears on TR1 emitter. The current in the collector circuit of TR1 is limited to approximately 200 m/A by resistor R8. The emitter of TR1 is directly connected to TR4 base, and when a current is set up in TR1, TR4 conducts heavily causing lamp 1 and lamp 4 to light up with the intensity of 10 watts. Because the lamps operate in pairs which are switched on and off quickly, they give an illumination substantially equal to that of a 21 watt fog lamp.

D1 is incorporated in the circuit for a dual purpose. The primary purpose is to protect the circuit from wrong polarity, and secondly if a 12 volt Zener diode is used, the unit is then able to work on a 24 volt system. Decoupling is carried out by C5.

By virtue of the circuit described, the lamps may be energised with little current generating little heat, and they will be of long life and will give a very bright illumination.

One or more lights as described may be mounted on the rear bumper of a vehicle. In use, when the vehicle is crashed or follows a crashed car the driver actuates the switch 9 to operate the light. The drivers of following cars will notice the light in sufficient time to stop without crashing and causing a multiple pile up. This has been proven in practice on several occasions on motorways.

Although the invention has been described in relation to a car, it may be used with sea and air vehicles and also to indicate fixed hazards such as in lighthouses, road works, etc. In the latter cases the light may be mounted on a fixed stand.

We claim:

1. A hazard warning light system comprising:
   a housing including a front light-transmitting face;
   a support plate mounted within said housing, said support plate having means for mounting a plurality of light bulbs therein, said means disposed generally on the perimeter of a circle;
   a plurality of pairs of light bulbs received by said light bulb mounting means of said support plate;
   the light bulbs of each pair mounted generally diametrically opposite to each other on said circle perimeter; and
   means for energizing said light bulbs so that both light bulbs of each pair are switched on and off together, and so that the pairs of light bulbs are energized in sequence, so that both bulbs of each pair are visible at the same time through the front light-transmitting face and give the illusion of a rotating light source.

2. A system as recited in claim 1 wherein said means for receiving said light bulbs on said support plate comprise a reflective surface positioned in association with each light bulb to reflect light from behind the light bulb toward said front light-transmitting face.

3. A system as recited in claim 1 further comprising means for receiving a central light bulb in said support plate, and a central light bulb mounted in said receiving means, said central light bulb having a power output significantly greater than the power output of each of said pairs of light bulbs.

4. A system as recited in claim 1 wherein three pairs of light bulbs, and associated light bulb receiving means, are provided, and wherein said light bulbs are approximately equally arcuately spaced around said circle perimeter.

5. A system as recited in claim 4 wherein each of said light bulbs has a power output of 5 watts or more.

6. A system as recited in claim 1 wherein said pairs of light bulbs are selected by number, wattage and disposition to give an illumination approximately equal to that of a 21 watt fog light.

7. A system as recited in claim 3 wherein said central light bulb comprises a fog light.

8. A system as recited in claim 1 wherein said means for energizing said light bulbs includes a control switch for switching the entire system on or off.

9. A system as recited in claim 8 wherein said control switch comprises an impact responsive switch.

10. A system as recited in claim 9 wherein said housing is mounted on the exterior of a motor vehicle so that said light-transmitting face is clearly visible from the rear of the motor vehicle.

11. A system as recited in claim 1 wherein said housing is mounted to the exterior of a motor vehicle so that said light-transmitting face is clearly visible from the rear of the motor vehicle and functions to warn approaching drivers of a hazard situation.

12. A system as recited in claim 1 wherein said means for energizing said light bulbs comprises circuitry means including a clock unit; a counter unit; and an energizing transistor associated with each pair of light bulbs; said clock unit connected to said counter unit so that pulses generated by said clock unit generate logic output in selected pins of said counter unit; and said counter unit being connected to each of said energizing transistors so that the outputs from each set of selected pins of said counter unit energize one of said energizing transistors.

13. A system as recited in claim 12 further comprising a buffer transistor operatively connected between each of said energizing transistors and said counter unit so that each output is passed to a buffer transistor before being passed to an energizing transistor.

14. A system as recited in claim 13 wherein each buffer transistor comprises means for passing a current having a value of below about 200 m/A to its associated energizing transistor.

15. A hazard warning system associated with the rear of a motor vehicle, and comprising:
   a housing having a front light-transmitting face;
   means for mounting said housing to the exterior of a motor vehicle so that said front light-transmitting face is clearly visible from the rear of the motor vehicle and functions to warn approaching drivers of a hazard situation;
   a support mounted within said housing, said support plate having means for mounting a plurality of pairs of light bulbs therein, said means including a reflective surface disposed so that when a light bulb is received by said means light from the light bulb will be reflected by said reflective surface to said front light-transmitting face;
   a plurality of pairs of light bulbs received by said light bulb mounting means; and
   means for energizing said light bulbs so that both light bulbs of each pair are on or off at the same time, and so that said pairs are energized sequentially so that both bulbs of each pair are visible at the same time through the front light-transmitting face and give the illusion of turning.

16. A system as recited in claim 15 wherein said means for energizing said light bulbs comprises circuitry means including a clock unit; a counter unit; and an energizing transistor associated with each pair of light bulbs; said clock unit connected to said counter unit so that pulses generated by said clock unit generate logic output in selected pins of said counter unit; and said counter unit being connected to each of said energizing transistors so that the outputs from each set of selected pins of said counter unit energize one of said energizing transistors.

17. A system as recited in claim 16 further comprising a buffer transistor operatively connected between each of said energizing transistors and said counter unit so that each output is passed to a buffer transistor before being passed to an energizing transistor.

18. A system as recited in claim 17 wherein each buffer transistor comprises means for passing a current having a value of below about 200 m/A to its associated energizing transistor.

19. A system as recited in claim 15 wherein said support plate further comprises means defining a central opening therein, and a central light bulb disposed in said central opening, said central light bulb having a significantly greater power output than any of the individual light bulbs of said pairs of light bulbs.

20. A system as recited in claim 19 wherein said means for energizing said light bulbs also includes means for energizing said central light bulb, and further includes: control switch means mounted within the passenger compartment of the motor vehicle, said control switch means for selectively switching said central light on and off, for selectively switching said pairs of light bulbs so that they may be energized sequentially, and for selectively switching both said central light bulb and said pairs of light bulbs.

* * * * *